June 7, 1927. H. C. LOOKABAUGH Re. 16,649
SAFETY GUARD FOR DANGEROUS HIGHWAYS AND THE LIKE
Original Filed Aug. 31, 1925
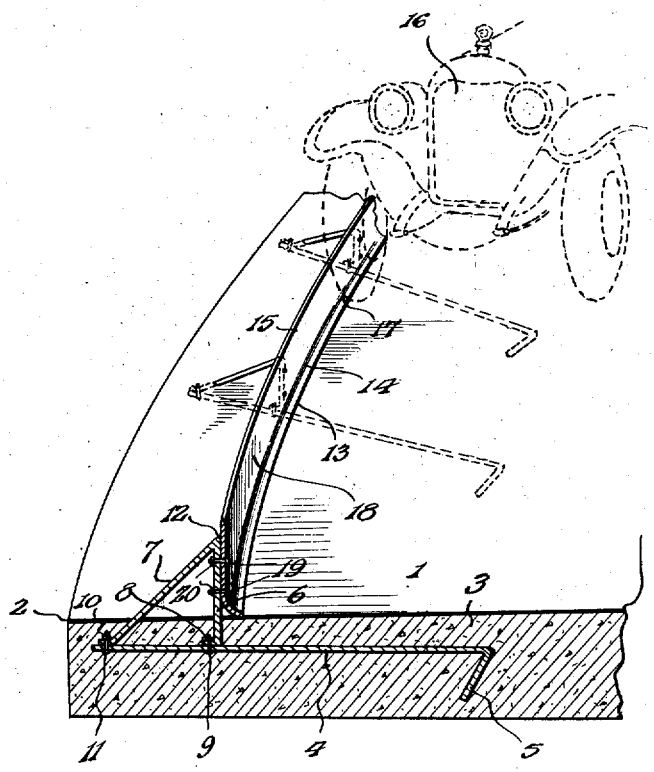
Inventor
H. C. Lookabaugh.
By Lacey & Lacey, Attorneys Reissued June 7, 1927. Re. 16,649

UNITED STATES PATENT OFFICE.

HARRY C. LOOKABAUGH, OF JACKSONVILLE, FLORIDA.

SAFETY GUARD FOR DANGEROUS HIGHWAYS AND THE LIKE.

Original No. 1,614,795, dated January 18, 1927, Serial No. 53,580, filed August 31, 1925. Application for reissue filed February 18, 1927. Serial No. 169,390.

My invention pertains to safety guards for dangerous highways and the like.

The object of my invention is to provide a device of the character described, which will be cheaply, easily and economically made, comparatively easily installed, provide entire safety to travelers up and down mountainous roads, and around dangerous curves thereon, and on other roads, prevent automobiles and other vehicles from going over the embankments, and automatically turn the wheels of said automobiles and other vehicles back into the highway from the course to which they have started towards the precipices.

The invention, novel features, details of construction, combination of parts, and other objects of the invention, will be hereinafter more particularly set forth, illustrated in the accompanying one sheet drawing, and pointed out in the appended claims.

Reference is hereby made to the drawing forming a part of this application, of which There is shown a perspective view of the device partially in section, showing the manner of installing and contacting the car wheel with the safety guard.

Similar characters designate all like parts.

The device consists of a metallic guard 18, placed along the outer edge, or other dangerous location, of a highway for automobiles, or other vehicles. It would preferably be expected to parallel the roadway. The guard 18 principally consists of an upright portion extending downwardly from its top 15 to the upper portion of a curve 14 near its bottom. The lower portion thereof is curved inwardly at 14 towards the roadbed to a point 13 where it reaches the roadbed. The guard is intended to be applied to all kinds of roadbeds, including rock, concrete, brick, asphalt, and the like. A metallic anchor is securely embedded under said roadbed, as shown at 4, 5, 6 and 7 in the concrete or other formation 3. The longest dimension of the anchor 4 is preferably parallel with the surface of the roadbed 1; the lowest portion 5 is a prong extending downwardly and outwardly below said horizontal portion; at the outermost point of the anchor the horizontal portion 4 and the inclined portion 7 are securely fastened by a bolt 11 and a nut 10, or other securing means. The inclined metallic arm 7 rises at approximately 45° to the point 12 a short distance below the top 15 of said guard 18, where, at point 12 it is turned downwardly and the downwardly extending portion 6 is securely fastened to said parallel portion 4 by bolt 9 and nut 8, or other securing means. The vertical or upright portion 6 is securely fastened to the guard 18 by bolts 19 and nuts 20, or other securing means. The inclined arm 7 and the vertical member 6 together constitute a brace for holding the upright guard firmly in place. These anchors are placed at such intervals along the guard and roadway as, with the general curve of the guard, the concave curve 13 and the form of the wheel at contacting point 17, to be sufficiently strong to protect the guard from allowing any vehicle from pushing or bending the guard over. It will also be seen by those familiar with the art to which my invention pertains that the principal force of an impact of an automobile or other vehicle against the guard will come primarily on the anchor near its top 12, the force of the impact would then be transferred along the inclined member 7 to 10 and along the horizontal portion 4 and to the lower end of the prong, or shank 5, requiring a tremendous pressure to turn or override the anchor. The curve of the guard 18 and the inwardly curved portion at the bottom thereof beginning at 13 near the roadbed and ending at 14 thereabove automatically act to turn the wheels of the automobile 16 back into the highway proper when the wheel strikes the curved portion at the bottom of the guard 18 at point of contact 17. It will be understood the guard 18 will be sufficiently low so as to prevent the hub of the wheel of the automobile from striking the guard and veering the automobile towards the guard, and wrecking the car or overriding the guard, and also preventing the wheel of the car from contacting the curve 13 at point of contact 17 so as to turn the wheel and car back into the highway proper. The force of the movement of the car and the slant of the curves 13 and 14 and the curve of the guard 18 have the effect on the wheel of contacting the guard to immediately throw the car back into the highway proper.

It will also be understood that the substantially built portion of the roadbed will be extended beyond the guard, and the guard anchor, to sufficiently protect the anchor where it extends downwardly and outwardly from point 12 to 10.

From the description of the one sheet accompanying drawing and the specifications, the advantages of the making, constructing, applying and operating of the guard will be apparent to those skilled in the art to which my invention pertains; but it will be understood that any modifications within the scope of the claimed invention may be made in the construction, operation and application without departing from the principle of the invention, or sacrificing any of its advantages.

Having thus described the invention, what is claimed and desired to be secured by Letters Patent, is:

1. A safety road guard embodying a longitudinally curved upright member having its lower edge curved toward the roadbed, a metallic anchor for embedment in the roadbed, and an angular brace attached to said upright and to said anchor.

2. A safety road guard embodying a longitudinally curved upright member having its lower edge curved toward the roadbed, a metallic anchor for embedment in the roadbed, and an angular brace attached to said upright and to said anchor, said lower curved edge being adapted to rest upon the roadbed and the attachment of said member to the brace being rigid and non-resilient.

3. A safety road guard embodying an upright member having its lower edge curved toward the roadbed, an anchor for embedment in the roadbed, and a brace attached to said upright and to said anchor.

4. A safety road guard embodying an upright member having its lower edge curved toward the roadbed, an anchor for embedment in the roadbed, and a brace attached to said upright and to said anchor, said lower curved edge of the upright being adapted to rest upon the roadbed and the attachment of said member to the brace being rigid and non-resilient.

5. A safety road guard embodying an upright member parallel with a roadbed and having its lower edge curved toward the roadbed, a metallic anchor embedded in the roadbed, and an angular brace attached to the upright and to the anchor.

In testimony whereof, I hereto set my hand.

HARRY C. LOOKABAUGH.